United States Patent [19]

Takada

[11] 4,145,245

[45] Mar. 20, 1979

[54] DOUBLE-EFFECT EVAPORATOR

[75] Inventor: Masaharu Takada, Kobe, Japan

[73] Assignee: Sasakura Engineering Company, Limited, Osaka, Japan

[21] Appl. No.: 787,163

[22] Filed: Apr. 13, 1977

[30] Foreign Application Priority Data

Apr. 20, 1976 [JP] Japan .............................. 51-49639[U]

[51] Int. Cl.² .......................... B01D 1/26; B01D 1/28
[52] U.S. Cl. ................................ 159/13 B; 159/20 R; 159/24 B; 159/DIG. 16; 203/26
[58] Field of Search ................ 159/13 B, 17 R, 17 P, 159/18, 19, 20, DIG. 16, 24 B; 203/24, 26

[56] References Cited

U.S. PATENT DOCUMENTS

| 3,185,580 | 5/1965 | Hanrahan et al. | 159/24 B |
|---|---|---|---|
| 3,395,084 | 7/1968 | Loebel et al. | 159/13 B |
| 3,471,373 | 10/1969 | Pottharst, Jr. | 203/26 |
| 3,489,654 | 1/1970 | Geiringer | 203/26 |
| 3,824,154 | 7/1974 | Takada et al. | 202/174 |
| 3,941,663 | 3/1976 | Steinbruchel | 159/13 B |

FOREIGN PATENT DOCUMENTS

| 49-35506 | 9/1974 | Japan | 159/17 C |
|---|---|---|---|
| 19568 of | 1914 | United Kingdom | 159/17 P |

*Primary Examiner*—Norman Yudkoff
*Attorney, Agent, or Firm*—Merriam, Marshall & Bicknell

[57] ABSTRACT

A double-effect evaporator comprises a first and a second effects and an external steam ejector, each of the effects having feed-liquid spray means, a bundle of heat-transfer tubes below the spray means and extending between headers, and a concentrated liquid collector. The first effect heat-transfer tubes extend perpendicularly to the second effect tubes. A suction port of the ejector opens into the second effect evaporation chamber. A diffuser of the ejector extends in parallel to the second effect heat-transfer tubes. A discharge port of the ejector opens into the inlet header of the first effect. The first effect evaporation chamber is connected with a duct straight to the inlet header of the second effect.

4 Claims, 3 Drawing Figures

DOUBLE-EFFECT EVAPORATOR

BACKGROUND OF THE INVENTION

This invention relates to a double-effect evaporator particularly adapted to meet emergent demands for distilled water in local or limited thirsty areas.

The conventional distillation plants have generally been permanently installed. However, where emergent supply of water for human consumption is necessary for local thirsty areas or when it is necessary to secure a supply of boiler feedwater and water for human consumption at construction sites and translocate a distillation plant to another place after completion of the construction work, there must be provided small-sized distillation plants suited for temporary service and movable to different places as required. Moreover, such plants must be as compact as possible without reducing their thermal efficiency.

Generally in a multiple-effect evaporator where vapor generated in an evaporation chamber is introduced to the next effect and used there as a heat medium, a higher flow resistance in the connecting pipelines through which the vapor is introduced reduces the efficiency of evaporation in the plant. It is, therefore, necessary to reduce the pressure losses as much as possible and such connecting lines are preferably straight or free of bends. Furthermore, in a multiple-effect evaporator, the water production ratio, i.e. the ratio of distilled water output to steam input, can be increased by drawing out vapor produced in the lowest temperature effect by a steam ejector without condensing it and by mixing it with the driving steam of the ejector to eject the mixture as a heating medium into the highest temperature effect so that the vapor is recycled or reused.

SUMMARY OF THE INVENTION

From the above considerations, it is an object of this invention to provide a double-effect evaporator of compact design and, despite its small size, having a high thermal efficiency and a high distillate production ratio, to be used for emergent supply of water for human consumption in locally thirsty areas or boiler feedwater in construction sites, and to be promptly transported to where it is needed, for example by a trailer.

BRIEF DESCRIPTION OF THE DRAWINGS

One specific but non-restrictive embodiment of this invention is shown in the accompanying drawings wherein.

DETAILED DESCRIPTION OF THE INVENTION

Figure 1:
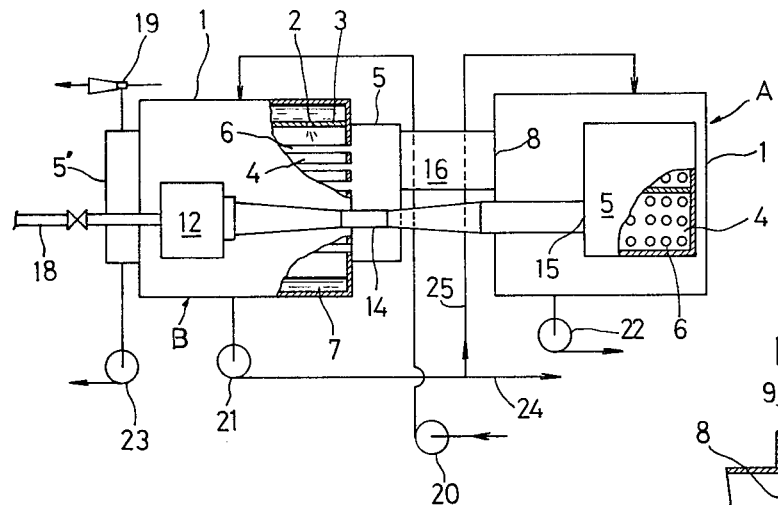
FIG. 1 is a schematic side elevational view partially exploded to show the internal structure of the evaporator with the tubes diagrammatically shown.
Figure 3:
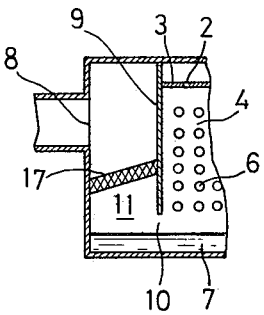
FIG. 2 is a schematic top plan view showing the directions of arrangement of horizontal heat-transfer tubes and FIG. 3 is a partial cross-sectional view taken along the line III-III of FIG. 2.
Figure 2:
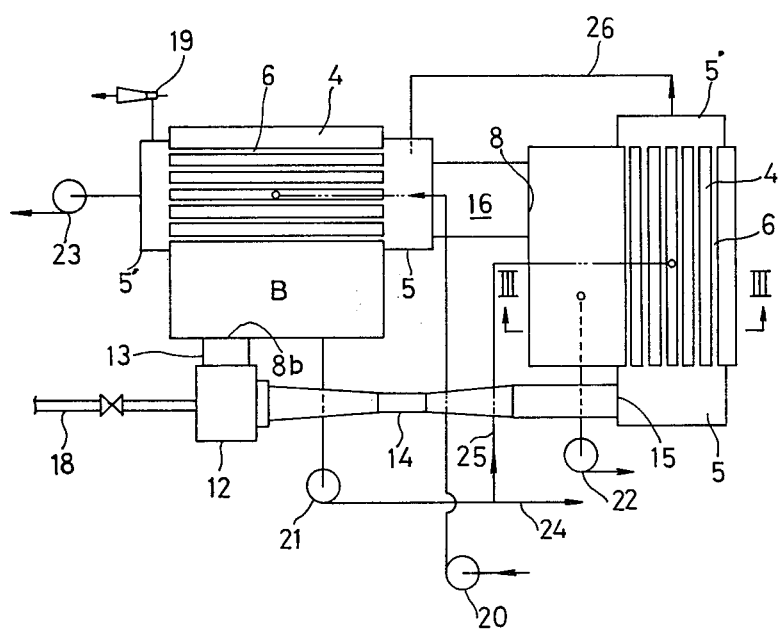

Referring to the drawings, a first effect A is substantially similar to a second effect B in construction. Feed-liquid spray means 3 having small holes or orifices 2 bored therethrough is disposed at a higher level within a casing 1. Within an evaporation chamber 4 under said spray means 3 is a bundle of substantially horizontal heat-transfer tubes 6 extending between headers 5 and 5', the floor of said casing being utilized as a collector 7 of the unevaporated portion of the feed-liquid. The evaporation chamber 4 is provided with a vapor exit 8 or 8b and, as shown in FIG. 4, may be formed with a vapor passageway 11 between chamber 4 and exit 8 or 8b as defined by a partition 9 with a clearance 10 communicating the chamber and the passageway.

A steam ejector 12 is located externally of the two effects with a suction pipe 13 for short communication with evaporation chamber 4 of effect B through a vapor exit 8b. A diffuser 14 extends from ejector 12 preferably in parallel with the heat-transfer tubes of the second effect B, with a vapor discharge port 15 thereof communicating with the inlet header 5 of the first effect A.

The evaporation chamber 4 of the first effect A is connected to the inlet header 5 of the second effect B through the vapor exit 8 by means of a short and straight pipe or duct 16 having a large cross-sectional area. The first and second effects are so arranged that the heat-transfer tubes of one of the effects extend perpendicularly or at a right angle to those of the orther effect. A mist separator 17 of mesh etc. is interposed in the vapor passageway 11. 18 is a pipe for the high-pressure steam for driving the ejector 12. 19 is a gas extractor; 20 is a feedwater pump; 21 is a concentrated water transfer pump; 22 is a concentrated water discharge pump; and 23 is a pump for withdrawing the condensate.

In operation, feedwater, e.g. sea water, drawn up by the pump 20 is introduced to the spray means 3 of the second effect B, where it is sprayed from the orifices 2 onto heat-transfer tubes 6 and a portion of the feed-liquid is evaporated upon heat exchange with a vapor fed into the tubes as will be described hereinafter. Vapor generated in chamber 4 flows through the clearance 10 and mist separator 17 by which the water droplets are removed. The vapor flows through the vapor passageway 11 to the vapor exit 8b and, thence, to the suction pipe 13 of the steam ejector 12. In the ejector 12, the low-pressure vapor thus drawn from effect B is mixed and reheated with a high-pressure driving steam and the mixed vapor is ejected from the discharge port 15 into the inlet header 5 of the first effect A, in which header the mixed vapor will be in an agitated state and may, as required, be cooled by the incorporation of condensate or the like thereinto before it is admitted into the heat-transfer tubes. The concentrate collected in the collector 7 of second effect B is pumped out by pump 21 and a portion thereof is discarded through a pipe 24, the remaining portion being fed to the apray means 3 of the first effect A through a bypass line 25 and sprayed into the evaporation chamber, in which it is evaporated by heat exchange on the heat-transfer tubes 6. The generated vapor flows through mist separator 17 in the vapor passageway 11 and the vapor exit 8 into the heat-transfer tubes of second effect B where it is used as a heat medium.

The concentrated water collects on the floor or effect A and is discharged form the apparatus by a pump 22, while the condensate produced within the tubes collects in the outlet header 5' and flowed through the pipe 26 to the inlet header 5 of the second effect B where a portion of the condensate is flashed into vapor and mixed with the vapor admitted from the first effect A through duct 16. The condensate collected at heater 5' of effect A may otherwise be taken outside. The mixed vapor flows through the heat-transfer tubes 6 of effect B and a portion thereof is condensed. The condensate collects in the outlet header 5' of effect B and then is withdrawn from the apparatus by pump 23. The noncondensable gas is released into the atmosphere by a gas extractor 19.

While, in the above embodiment, a portion of the concentrated water in collector 7 of the second effect B is fed to the first effect A by pump 21, feed water may otherwise be introduced to effect A.

As described hereinbefore in detail, the horizontal heat-transfer tubes of the first effect are arranged to extend perpendicularly to those of the second effects; the suction port of the external steam ejector opens adjacently to the second effect evaporation chamber; the diffuser of the ejector is disposed in parallel to the heat-exchange tubes of effect B, with the discharge port of the diffuser open to the inlet header of the first effect. Accordingly, the evaporation system is assembled compact and trim as illustrated in the drawings, being suited for loading on a vehicle such as a trailer. For exapmple, the double-effect evaporator having a daily production capacity of 100 to 200 ton distillate may be minimized so as to be easily transported together with a boiler on a trailer. Thus, the evaporator according to this invention can be transported quickly to a local thirsty area or a construction site for timely supply of distilled water. Moreover, vapor generated in the first effect flows straight and immediately into the second effect through a short duct, thereby minimizing flow resistance. Furthermore, because vapor generated in the second effect is reheated and utilized, the apparatus has a high thermal efficiency for its small size.

What is claimed is:

1. A double-effect evaporator comprising a first effect and a second effect each consisting essentially of
    spray means at an upper portion in a casing for spraying feed-liquid,
    a bundle of heat-exchange tubes in said casing below said spray means and extending substantially horizontally in an evaporation chamber in said casing between inlet and outlet headers, and
    a concentrated liquid collector at the bottom of said casing,
    said evaporator further comprising steam ejector means externally of said effects,
    said heat-exchange tubes of said first effect extending perpendicularly to the heat-exchange tubes of said second effect,
    said ejector means being closely adjacent said second effect and a suction port of said ejector means opening into said evaporation chamber of said second effect while a discharge port of said ejector means opens into said inlet header of said first effect, and
    said evaporation chamber of said first effect having an outlet closely adjacent and connected to said inlet header of said second effect, whereby said evaporator is compactly assembled.

2. A double-effect evaporator claimed in claim 1, wherein said ejector means includes a diffuser extending in parallel to said heat-exchange tubes of said second effect.

3. A double-effect evaporator claimed in claim 1, wherein a short and straight duct connects said outlet of said evaporation chamber of said first effect to said inlet header of said second effect.

4. A double-effect evaporator comprising a first effect and a second effect mounted closely adjacent each other, each of said effects comprising a casing forming an evaporation chamber at the upper side thereof and a liquid collector at the lower side thereof,
    spray means in said evaporation chamber in said casing for spraying feed-liquid,
    a bundle of heat-exchange tubes in said evaporation chamber below said spray means and extending substantially horizontally between inlet and outlet headers at the sides of said casing,
    said heat-exchange tubes of said first effect extending perpendicularly to the heat-exchange tubes of said second effect,
    said evaporator further comprising steam ejector means externally of said effects and closely adjacent said casing of said second effect,
    a suction port of said ejector means opening into said evaporation chamber of said second effect and a discharge port of said ejector means extending to and opening into said inlet header of said first effect,
    said outlet header and said evaporation chamber of said first effect being piped to said inlet header of said second effect.

* * * * *